(12) United States Patent
Singh et al.

(10) Patent No.: US 9,479,541 B2
(45) Date of Patent: Oct. 25, 2016

(54) SHARING DATA ACROSS PROFILES

(71) Applicants: BlackBerry Limited, Waterloo (CA); 2236008 Ontario Inc., Waterloo (CA)

(72) Inventors: Ravi Singh, Toronto (CA); Daniel Jonas Major, Ottawa (CA); Sivakumar Nagarajan, Ottawa (CA)

(73) Assignees: BlackBerry Limited, Waterloo, Ontario (CA); 2236008 Ontario Inc., Waterloo, Ontario (CA)

( * ) Notice: Subject to any disclaimer, the term of this patent is extended or adjusted under 35 U.S.C. 154(b) by 11 days.

(21) Appl. No.: 14/550,660

(22) Filed: Nov. 21, 2014

(65) Prior Publication Data

US 2016/0149958 A1    May 26, 2016

(51) Int. Cl.
*G06F 9/54* (2006.01)
*H04L 29/06* (2006.01)
*G06F 21/62* (2013.01)

(52) U.S. Cl.
CPC ............ *H04L 63/205* (2013.01); *G06F 9/541* (2013.01); *G06F 21/62* (2013.01); *H04L 63/107* (2013.01)

(58) Field of Classification Search
CPC ... H04L 63/205; H04L 63/107; G06F 9/541; G06F 17/30029
USPC ............................................................ 726/1
See application file for complete search history.

(56) References Cited

U.S. PATENT DOCUMENTS

| | | |
|---|---|---|
| 6,202,099 B1 | 3/2001 | Gillies et al. |
| 2013/0124583 A1* | 5/2013 | Ferguson .......... G06F 17/30029 707/821 |
| 2014/0115158 A1 | 4/2014 | Bender et al. |

OTHER PUBLICATIONS

Extended European Search Report issued in European application No. 15195721.4 dated Jan. 28, 2016; 8 pages.
Android Developers—Android Lollipop; http://developer.android.com/about/versions/lollipop.html#; retrieved Nov. 20, 2014.
Android Developers—Android 5.0 APIs; Enterprise Environment; http://developer.android.com/about/versions/android-5.0.html#Enterprise; retrieved Nov. 20, 2014.

* cited by examiner

*Primary Examiner* — Kambiz Zand
*Assistant Examiner* — Noura Zoubair
(74) *Attorney, Agent, or Firm* — Fish & Richardson P.C.

(57) ABSTRACT

Systems, methods, and software can be used to share data across profiles. In some aspects, a first request from a first application for application data associated with a second application is received at a first hybrid agent. The first application and the first hybrid agent are associated with a first profile on a mobile device. The second application is associated with a second profile. A second request for the application data is sent to a second hybrid agent. The second hybrid agent is associated with the second profile. The application data from the second hybrid agent is received from the second hybrid agent. The application data is sent to the first application. The application data is used by the first application to generate a graphical interface for presentation on the mobile device. The graphical interface includes a unified view of data associated with the first and second profiles.

18 Claims, 2 Drawing Sheets

SHARING DATA ACROSS PROFILES

BACKGROUND

The present disclosure relates to sharing data across profiles in a communication device. Many communication devices, e.g., mobile devices, or other computer systems, enable users to run applications on the communication devices. The applications may access application data stored on the communication devices.

DESCRIPTION OF DRAWINGS

Like reference numbers and designations in the various drawings indicate like elements.

DETAILED DESCRIPTION

Figure 1:
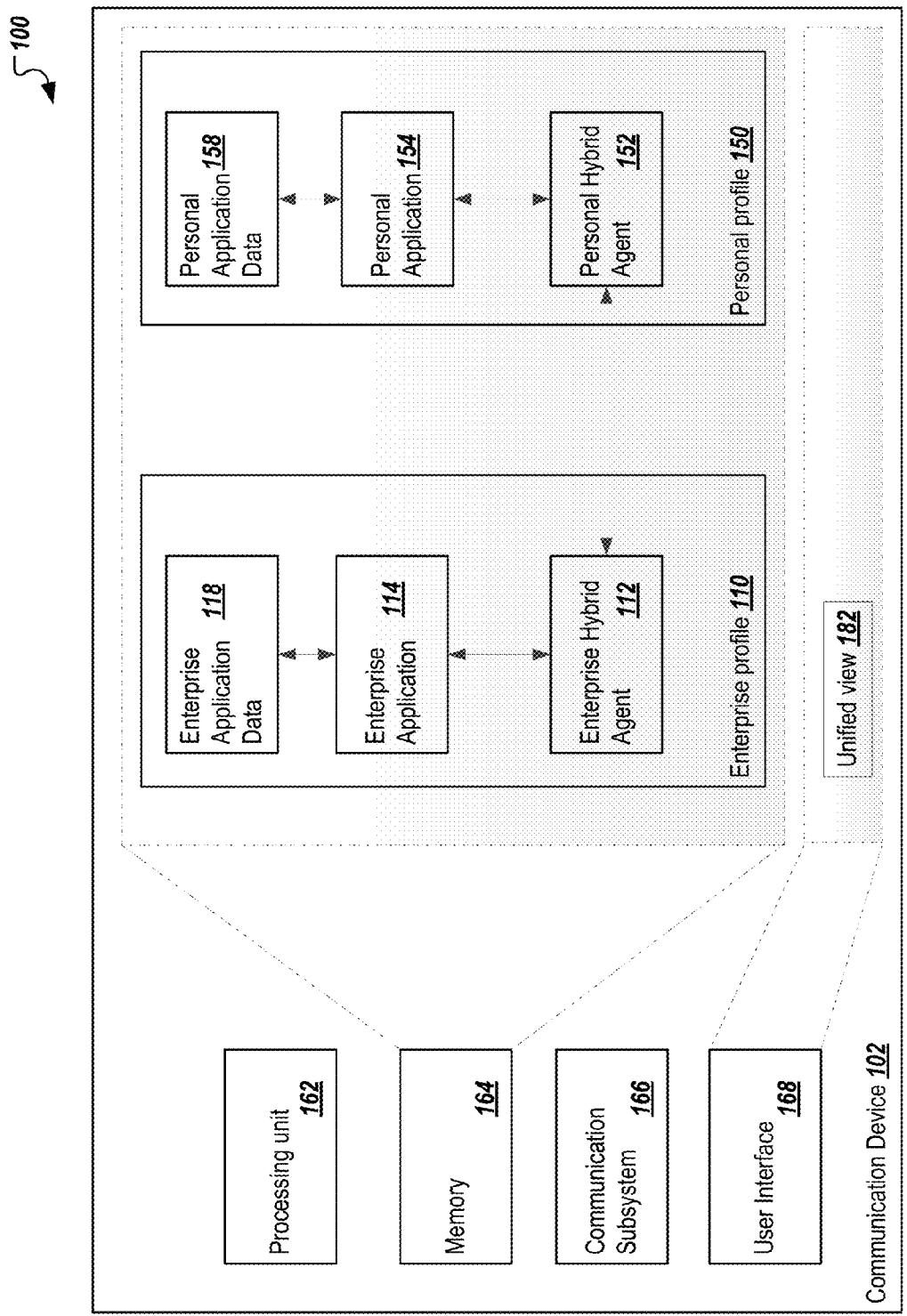
FIG. 1 is a schematic diagram showing data sharing across profiles in an example communication device.

Many communication devices, e.g., mobile devices or other computing systems, use profiles to manage access to data stored on the communication devices. For example, a communication device may have a personal profile for a user's personal data and applications, and an enterprise profile for a user's enterprise data and applications.

Using profiles to regulate data access on a communication device can help enterprises reduce the risk that enterprise data will be leaked, for example, to malicious or vulnerable applications. For example, enterprises can give users the freedom to install their personal application in a personal profile, while controlling access to data associated with an enterprise profile. On the other hand, security implications associated with accessing data on a device can be balanced with other concerns, such as speed, convenience, user experience, etc. Although enterprise and personal data, software, and other applications can be segregated on a device, there may be instances where resources can be shared (e.g., for improved speed or data accessibility) without compromising security. In some instances, where a user has two or more profiles, it may be desirable for some applications to access data in both profiles and to present the user with a single, unified view. For example, the communication device may present personal and enterprise emails within a single screen. After an email in the list is selected for display, the device may launch an appropriate viewer within the appropriate profile to view the full text of the email.

In some implementations, hybrid agents can be used to provide secure data sharing across profiles. For example, a personal hybrid agent can be installed in the personal profile and an enterprise hybrid agent can be installed in the enterprise profile. Each hybrid agent can access data within its respective profile. For example, the personal hybrid agent can access data in the personal profile, and the enterprise hybrid agent can access data in the enterprise profile. Each hybrid agent can expose Application Program Interfaces (APIs) to applications installed within their respective profiles. If an application in the personal profile, e.g., a unified email viewer application, wishes to access emails in the enterprise profile, the unified email viewer application can contact the personal hybrid agent, which in turn can contact the enterprise hybrid agent. The enterprise hybrid agent can request email data from the associated email application within the enterprise profile. Upon receiving the email data, the enterprise hybrid agent can send the email data to the personal hybrid agent, which in turn can provide the email data to the unified email viewer application to present a unified view of emails.

In general, profiles can be implemented as groups of resources having a common management scheme, where each profile generally includes one or more resources and one or more policies regarding use of or access to the one or more resources. Profiles may be implemented on data communication systems that include a device and can be used to logically separate information (e.g., files, applications, certificates, configuration data, network connections, data, and the like) on the device. For example, the device can implement two or more profiles, which can include a personal profile, an enterprise or work profile, or a combination of these and other types of profiles. In some implementations, the device may include multiple personal profiles, multiple enterprise profiles, or both. A personal profile can be managed by a device user, and an enterprise profile can be managed by an enterprise or corporate administrator. In some implementations, the enterprise or corporate administrator can additionally manage the personal profile or the device or both. A device purchased, owned, or otherwise provided by an enterprise, employer, or corporation may generally be referred to as a corporate-liable device, while a device purchased, owned, or otherwise provided by an employee or individual may generally be referred to as a personal-liable device or an individual-liable device.

In some implementations, each profile on a device (e.g., enterprise or personal) has its own file system on the device, and separation between profiles can be provided, at least partially, by the separation of the file systems on the device. In some cases, some of the resources of each profile (e.g., data and policies) are stored in a dedicated file system for the profile, while other resources of each profile (e.g., applications) are stored outside of the dedicated file system.

Separation of file systems can be logical, physical, or both. A physical separation of file systems can be implemented, for example, by designating physically separate memory locations (e.g., separate memory devices or separate blocks in the same memory) for each file system. A logical separation of file systems can be implemented, for example, by designating logically separate data structures (e.g., separate directories, etc.) for each file system. In some implementations, each file system has its own encryption parameters. For example, the file system for a corporate profile can have its own encryption key and a higher encryption strength, while a file system for a personal profile can have its own encryption key and lower encryption strength. In some instances, the file system for the personal profile has the same encryption strength as the corporate profile, or the file system for the personal profile can be unencrypted.

As described above, a profile can include a group of resources that share a common management scheme governing the use of resources in the group and can encompass both the resources and the management policies that describe how the resources may be used. The management policies can include security policies, which can be defined for the profile. Applications executable by the device can include resources that, when executed, request access to other resources or provide resources to other applications (or both). For an application that is assigned to or associated with a profile, resources included in the application can be included in the group of resources included in the profile. Further, security policies defined for the profile can restrict the application to resources included in the group. Thus, when the application is executed within the profile, security policies included in the management policies of the profile can determine whether or not the resources associated with the application can access other resources, such as resources included in the group or resources outside the group (or both), or grant access to other applications, such as applications assigned to or associated with or not assigned to or associated with the profile (or both).

In some implementations, when a resource (e.g., an application) is "launched into" a profile, an instance of the application can be instantiated in the profile. The policy of the profile where an application is launched can determine, at least partially, what resources (e.g., data resources, network resources, etc.) the application can access or execute. As such, when an instance of an application is running in a profile, permissions for the instance of the application are determined based at least partially on the policy of the profile. For some applications, access to resources outside a profile can be determined, at least partially, based on the policies of the other profile.

In some implementations, a profile can divide or segregate different categories of data (e.g., work data, personal data, etc.) from the operating system level all the way to the user interface. As such, the profile architecture can provide protection of data at the operating system level, the file level, the user interface level, and other levels of the device. A profile can, in some cases, ensure a complete separation between the different categories of data, applications, and the user experience, while at the same time also allowing the different categories of data to co-exist in the same application and share data when desired. In some instances, applications can be limited to an individual profile view (e.g., a "work" or "personal" profile view). For example, a social networking application can be configured to appear only in the personal profile. In some instances, separate instances of the same application can run in multiple profiles. For example, a device can have an instance of a social networking application (e.g., Facebook, Twitter, etc.) running in a personal profile for a user's personal account, and the device can have an instance of the same social networking application running in a corporate profile for the user's company or the user's corporate account. In some instances, an application in one profile can be configured to present a unified view of data across multiple profiles. The application can access data in other profiles though hybrid agents.

In some implementations, an operating system of the communication device can include core applications that are not associated with one particular profile. Applications in multiple profiles can launch the core application. A core application can be configured to segregate the data associated with the core application according to the calling application, thereby limiting data access of the calling application. For example, if an enterprise application calls a core application, e.g., a clipboard, the core application can access the data associated with the enterprise profile, but not the data associated with the personal profile.

FIG. 1 is a schematic diagram 100 showing an example of data sharing across profiles in an example communication device 102. The example communication device 102 shown in FIG. 1 is operable to receive a request from a user and, in response to the request, present a unified view of data associated with more than one profile on the communication device 102. The communication device 102 includes a processing unit 162, a communication subsystem 166, a user interface 168, and a memory 164. A communication device may include additional, different, or fewer features, as appropriate. The diagram in FIG. 1 also shows an enterprise profile 110 and a personal profile 150 stored in the memory 164. Additional or different profiles may be stored in the memory 164 or other components in a communication device, as appropriate in various implementations.

The example processing unit 162 can include one or more processing components (alternatively referred to as "processors" or "central processing units" (CPUs)) configured to execute instructions related to one or more of the processes, steps, or actions described above in connection with one or more of the implementations disclosed herein. In some implementations, the processing unit 162 can be configured to generate control information, such as a measurement report, or respond to received information, such as control information from a network node. The processing unit 162 can also be configured to make an RRM decision such as cell selection/reselection information or trigger a measurement report. The processing unit 162 can also include other auxiliary components, such as random access memory (RAM) and read-only memory (ROM).

The example communication subsystem 166 can be configured to provide wireless or wireline communication for data or control information provided by the processing unit 162. The communication subsystem 166 can include, for example, one or more antennas, a receiver, a transmitter, a local oscillator, a mixer, and a digital signal processing (DSP) unit. In some implementations, the communication subsystem 166 can support multiple input multiple output (MIMO) transmissions. In some implementations, the receivers in the communication subsystem 166 can be an advance receiver or a baseline receiver. Two receivers can be implemented with identical, similar, or different receiver processing algorithms.

The example user interface 168 can include, for example, one or more of a display or touch screen display (for example, a liquid crystal display (LCD), a light emitting display (LED), an organic light emitting display (OLED), or a micro-electromechanical system (MEMS) display), a keyboard or keypad, a trackball, a speaker, or a microphone. As shown in FIG. 1, the example user interface 168 presents a unified view 182. The unified view 182 can be a graphic representation of data associated with multiple profiles. The user interface 168 can also include I/O interface, for example, a universal serial bus (USB) interface.

The example memory 164 can be a computer-readable storage medium on the communication device 102. Examples of the memory 164 include volatile and non-volatile memory, magnetic media, optical media, random access memory (RAM), read-only memory (ROM), removable media, and others. The memory 164 can store an operating system (OS) of the communication device 102 and various other computer-executable software programs for performing one or more of the processes, steps, or actions described above.

Profiles, e.g., the example enterprise profile 110 and the example personal profile 150, can logically separate resources (e.g., applications, data, network access resources, configuration files, etc.) such that resources in a given profile can, in some instances, be prevented from accessing resources included in a different profile. For example, personal resources in the personal profile 150 may be prevented from accessing corporate resources in the enterprise profile 110, or vice-versa. In some cases, as will be described in more detail below, a resource in a profile can access resources in another profile by using hybrid agents.

In some instances, individual profiles can be added, deleted, or modified. An owner of the communication device 102 may have the ability to add or remove individual profiles from communication device 102. In some implementations, a user can create one or more profiles. In some instances, an enterprise can send the device information identifying the initial resources (e.g., applications, policies, configurations, etc.) for a new profile. A profile administrator may assign security policies for the profiles and initiate profile updates. In some implementations, profile administrators can remotely lock or wipe a profile.

As shown in FIG. 1, the example enterprise profile 110 includes an enterprise hybrid agent 112, an enterprise application 114, and enterprise application data 118 that is associated with the enterprise application 114. The personal profile 150 includes a personal hybrid agent 152, a personal application 154, and personal application data 158 that is associated with the personal application 154.

Applications, e.g., the enterprise application 114 and the personal application 154, can include programs, modules, scripts, processes, or other objects that can execute, change, delete, generate, or process application data. For example, applications can be implemented as Enterprise Java Beans (EJBs). Design-time components may have the ability to generate run-time implementations into different platforms, such as J2EE (Java 2 Platform, Enterprise Edition), ABAP (Advanced Business Application Programming) objects, or Microsoft's .NET. Further, while illustrated as internal to the communication device 102, one or more processes associated with an application may be stored, referenced, or executed remotely. For example, a portion of an application may be an interface to a web service that is remotely executed. Moreover, an application may be a child or sub-module of another software module (not illustrated).

Application data, e.g., the enterprise application data 118 and the personal application data 158, can include various types of data. The example memory 164 can store various objects, including files, classes, frameworks, backup data, business objects, jobs, web pages, web page templates, database tables, repositories storing business or dynamic information, and other information including parameters, variables, algorithms, instructions, rules, constraints, or references thereto. The application data may include information that is associated with an application, a network, a user, and other information.

In some cases, an application can be associated with application data in the same profile. In one example, a personal application 154 can be an email viewer in the personal profile 150. The personal application 154, i.e., the email viewer, can be associated with the personal application data 158 stored in the personal profile 150. In such an example, the personal application data 158 can include information of senders, receivers, subjects, timestamps, and other metadata of one or more emails.

Hybrid agents, e.g., the example enterprise hybrid agent 112 and the personal hybrid agent 152, can be configured to discover other hybrid agents, establish communication channels with other hybrid agents, submit requests for application data to other hybrid agents, and receive application data from other hybrid agents.

In some implementations, an enterprise mobility manager (EMM), a device policy client (DPC), an associated PIM application, or other applications may be configured to install a hybrid agent in a profile. In some cases, a communication device can pre-install a hybrid agent in each profile.

In some implementations, a hybrid agent can establish communication channels with the other hybrid agent by sending a command to the other hybrid agent. In some cases, an operation system (OS) can configure one or more commands that may be transmitted between profiles. For example, an Android OS can configure an "intent" command to be sent between two profiles. In such an example, an administrator may whitelist a specific command, e.g., a specific intent, to pass between the personal profile 150 and the enterprise profile 110. When a hybrid agent discovery operation is initiated, each hybrid agent can send an intent to the corresponding hybrid agent in the other profile. For example, when the enterprise profile 110 is created, the enterprise hybrid agent 112 can send an intent to hybrid agents in other profiles. The hybrid agents in other profiles can also send intents to the enterprise hybrid agent 112.

In some examples, hybrid agents can use communication handles to establish communication channels between the hybrid agents. In some implementations, a first hybrid agent can send a first intent to the second hybrid agent. The first intent can include a first communication handle. The first communication handle can be used to establish a communication channel to the first hybrid agent. Upon receiving the first communication handle, the second hybrid agent can use the first communication handle to send a second communication handle to the first hybrid agent. The second communication handle can be used to establish a communication channel to the second hybrid agent. Thus, the first and the second hybrid agents now have each other's communication handles, and thereby can establish a bi-direction communication channel between the hybrid agents. The communication channel can be used to send and receive subsequent communications between the hybrid agents. The following descriptions represent an example implementation of a discovery operation for a hybrid agent in a primary profile and a hybrid agent in a managed profile. The example implementation can be used on an Android platform.

First, before the discovery operation, each hybrid agent exposes a remote procedure call (RPC) interface, e.g. the binder interface on the Android platform, and thereby becomes ready to accept remote function calls and service several requests simultaneously by using a thread pool. Each hybrid agent, as a result of being the same application/file, has two activities. The first activity responds to action BOOTSTRAP_PRIMARY and the second activity responds to BOOTSTRAP_MANAGED. On installation, the DPC whitelists an intent with specific actions (BOOTSTRAP_PRIMARY and BOOTSTRAP_MANAGED).

Next, during each boot up or on initial installation into a profile, a hybrid agent in the primary profile disables its activity that responds to BOOTSTRAP_MANAGED. A hybrid agent in the managed profile disables its activity that responds to BOOTSTRAP_PRIMARY. Each hybrid agent sends an intent to the other hybrid agent. For example, the hybrid agent in the primary profile sends BOOTSTRAP_MANAGED, and the hybrid agent in the managed profile sends BOOTSTRAP_PRIMARY. The intent includes a binder handle back to sender. Because each hybrid agent disables the component that corresponds to the intent sent by the hybrid agent, only the hybrid agent in the other profile resolves the intent.

In some implementations, a hybrid agent, e.g., the example enterprise hybrid agent 112 or the personal hybrid agent 152, can expose an API to an application in its respective profile, e.g., the enterprise application 114 or the personal application 154, respectively. The exposed API can be used by an application in one profile to request data associated with applications in other profiles. In some cases, the applications that provide data are referred to as content providers. In some implementations, the API can have the same format as an API that is used to access data associated with content providers in the same profile. For example, in a communication device that runs an Android OS, a calling application can use a Content Provider API to send a request for data associated with a content provider in the same profile. In the request, the calling application can specify target uniform resource identifier (URI) strings, e.g., "content://contacts," to identify the content provider that the calling application wishes to receive data from. A hybrid agent may expose the same Content Provider API to applications that wish to access data associated with content providers in other profiles. For example, if a personal application sends a request that includes "content://hybrid-to-enterprise/contact" as the target URI strings to a personal hybrid agent, the personal hybrid agent can interpret the request and contact the enterprise hybrid agent for the requested data. The enterprise hybrid agent can contact the content provider that is identified by the target URI strings "content://contact" in the enterprise profile to retrieve the requested data. Using the same API formats enables applications to seamlessly access data associated with content providers in the same or different profiles.

In some communication devices, e.g., a communication device that runs an Android OS, an application can request a cursor for a table view of data. The calling application can use the cursor to iterate through each record in the table and read data from a content provider. A hybrid agent can maintain a list of cursors that are open across profiles. The hybrid agent can use cursors to iterate and read commands from the calling application and request data from a hybrid agent in a different profile. The following descriptions represent an example implementation of a data retrieving operation across profiles.

First, a personal application sends a query to the personal hybrid agent. The query includes a URI of content://hybrid-agent/query?content%3A%2F%2Fcontacts ("content%3A%2F%2Fcontacts" is the URI-encoded version of content://contacts), which identifies the content provider. The personal application uses the standard ContentResolver.query interface to send the query. In some implementations, the personal application can call a different ContentResolver method to update, modify, or delete data associated with a content provider in a different profile.

Next, the personal hybrid agent receives the query via its hybrid Content Provider interface. Through binder, the personal hybrid agent asks the enterprise hybrid agent to make a query in the enterprise profile. The enterprise hybrid agent and the activity manager attempt to resolve the content provider in the enterprise profile. If the content provider is found, the enterprise hybrid agent runs the query against the content provider and gets back a cursor, which can be another binder abstraction. If successful, the enterprise hybrid agent stores a cross-process cursor in a local table and associates it with a binder token. The binder token is returned to the personal hybrid agent, which stores it inside a special construct called a Hybrid Client Cursor. The Hybrid Client Cursor is returned to the personal application.

Next, the personal application makes a function call on its local cursor, which is routed to the Hybrid Client Cursor running in the personal hybrid agent. The Hybrid Client Cursor calls over to the enterprise hybrid agent, requesting it to perform the cursor operation, and passes in the associated binder token. The enterprise hybrid agent receives the cursor function call, finds the appropriate binder token in its table and thus the relevant cursor, and performs the cursor operation. The cursor operation can cause the cursor operation to run in the final content provider's process. The result data is passed from the content provider to the enterprise hybrid agent, and then to the personal hybrid agent via the Hybrid Client Cursor, and then in turn to the personal application.

In some implementations, an application on one profile can become a content provider in another profile. For example, in a communication device running an Android OS, a client can ask the Content Service, which is a system service of the Android OS, to inform it about updates to a given content URI. The Content Service can pass a binder handle back to the client. A content provider can tell the Content Service that there has been an update to data at a particular URI, and the Content Service can broadcast that message to all interested recipients, including the client. The Content Service can inform all registered ContentObservers, via their binder handles, that content has been updated at the given URI. The following represent an example implementation for a personal application to become a content provider across profiles.

First, the personal application calls a new personal hybrid agent API to register as a ContentObserver for a given URI. In this call, the personal application passes in a binder handle back to an IContentProvider binder running inside the personal application's process.

Next, the personal hybrid agent passes the ContentObserver binder handle across to the enterprise hybrid agent.

Next, the enterprise hybrid agent registers the ContentObserver with ContentService, under the context of the user of the enterprise hybrid agent.

Next, if the personal application process dies, the Content Service can detect and clean up the ContentObserver binder handle.

In some implementations, if a profile is removed, the binder death of the hybrid agent in the removed profile can be detected by hybrid agents in other profiles. These hybrid agents can broadcast messages to listening applications, who can clean up their UI and data.

In some implementations, e.g., in a communication device running an Android OS, hybrid agents may not be bound to each other through standard Android service binding. In these cases, while an Activity Manager may know that UIB is communicating to a client hybrid agent through standard Content Provider or service binding interfaces, the Activity Manager may not know that the client hybrid agent is talking to a server hybrid agent. Therefore, a Low Memory Killer may kill the server hybrid agent at a point, even if the foreground UIB application is drawing data from it. Two approaches can be used to resolve this issue. First, a server hybrid agent can show a special notification in the notification drawer, which may make the OS platform unlikely to kill off the process. Second, a hybrid agent can be pre-installed into the System partition and can thus request to be "persistent" to avoid being shut down.

In some implementations, access to profile resources (e.g., application and application data) may be controlled by defining, assigning, or otherwise associating a security policy to each profile. A security policy may include parameters, variables, policies, algorithms, instructions, settings, or rules for enabling or preventing access to resources in one or more profiles. A security policy for a profile can be implemented in various formats and can include various types of information. A security policy can specify access to both the resources in another profile that can be accessed by applications running in the profile and resources in the profile that can be accessed by applications running in another profile. For example, a given profile's security policy may identify other profiles that are accessible, resources that are not accessible to other profiles, or both. A profile's security policy may identify specific users that can or cannot access specified resources in the profile. In some implementations, the security policies from both profiles determine whether cross-profile access is granted.

In some implementations, a security policy can define or otherwise identify a process for user authentication. For example, a security policy can identify the type and content of user authentication (e.g., password strength, lifecycle) to apply to a cross-profile request.

In some implementations, the security policy for how data is passed across profiles can be configured by an administrator. The security policy can be configured at application level, e.g., determining which application can send or receive data across profiles. The security policy can be at data level, e.g., determining how much data and what type of data from a specific application can be transmitted. In some implementations, when a user provides a request to access multiple profiles, the request can be evaluated by the security policies of both profiles. If both policies grant access, then the cross-profile request may be granted.

In some implementations, a security policy can be symmetric or asymmetric. For example, under one security policy, a personal application in the personal profile can use the personal hybrid agent to access enterprise data, and an enterprise application in the enterprise profile can use the enterprise hybrid agent to access personal data. This approach enables unified view applications to run in either the personal or the enterprise profile. Additionally or alternatively, the security policy can be asymmetric. For example, an administrator can determine that data can flow into the enterprise profile but cannot flow out of the enterprise profile. In such a case, the personal hybrid agent can send data to the enterprise hybrid agent, and a unified application can be installed into the enterprise profile.

In some implementations, the hybrid agents can enforce a security policy by examining applications that are attempting to call their exposed APIs based on, e.g., signatures or permissions. The hybrid agents can determine whether the calling application is allowed to consume the hybrid agent's APIs and read data from the other profile.

In addition, the hybrid agents, the applications that are transmitting data across profiles, or the combinations thereof can enforce a security policy by detecting that the data is requested across profiles, and thereby prevent non-pertinent data from being passed. For example, an email provider in the enterprise profile can send email subject lines rather than full emails to the personal profile, if the configured use for the data is to show a unified email list from an application in the personal profile.

In some implementations, a security policy can be enforced in the communication channel between the hybrid agents. In some implementations, the incoming binder call from one hybrid agent to another supplies the caller's UID. A Package Manager can provide the package name of a given UID. The called hybrid agent can check that package name of the called hybrid agent to confirm that identity of the called hybrid agent. Example function calls that can be used to perform this operation include: Binder.getCallerUID, PackageManager.getPackagesForUid(uid), PackageManager.getPackageInfo(package, flags), and PackageManager.checkSignatures.

In some implementations, a security policy can be enforced in the communication channel between a client application and a client hybrid agent. In some cases, the client hybrid agent can check the package signatures of the client application. Additionally or alternatively, a permission can be used to restrict the content provider interfaces. The permission can be assigned to applications with matching signatures.

In some implementations, a security policy can be enforced in the communication channel between a content provider and a hybrid agent. For example, the content provider can check the incoming UID (via binder) to determine the package name of the calling application and determine that the data is requested by a hybrid agent for cross-profile consumption. The content provider can restrict the data it wishes to send. In some implementations, the DevicePolicyClient/EMM can push down application policy blobs. These application policy blobs can represent security policies that limit cross-profile data sharing. The content providers can read these application policy blobs and enforce these security policies.

Figure 2:
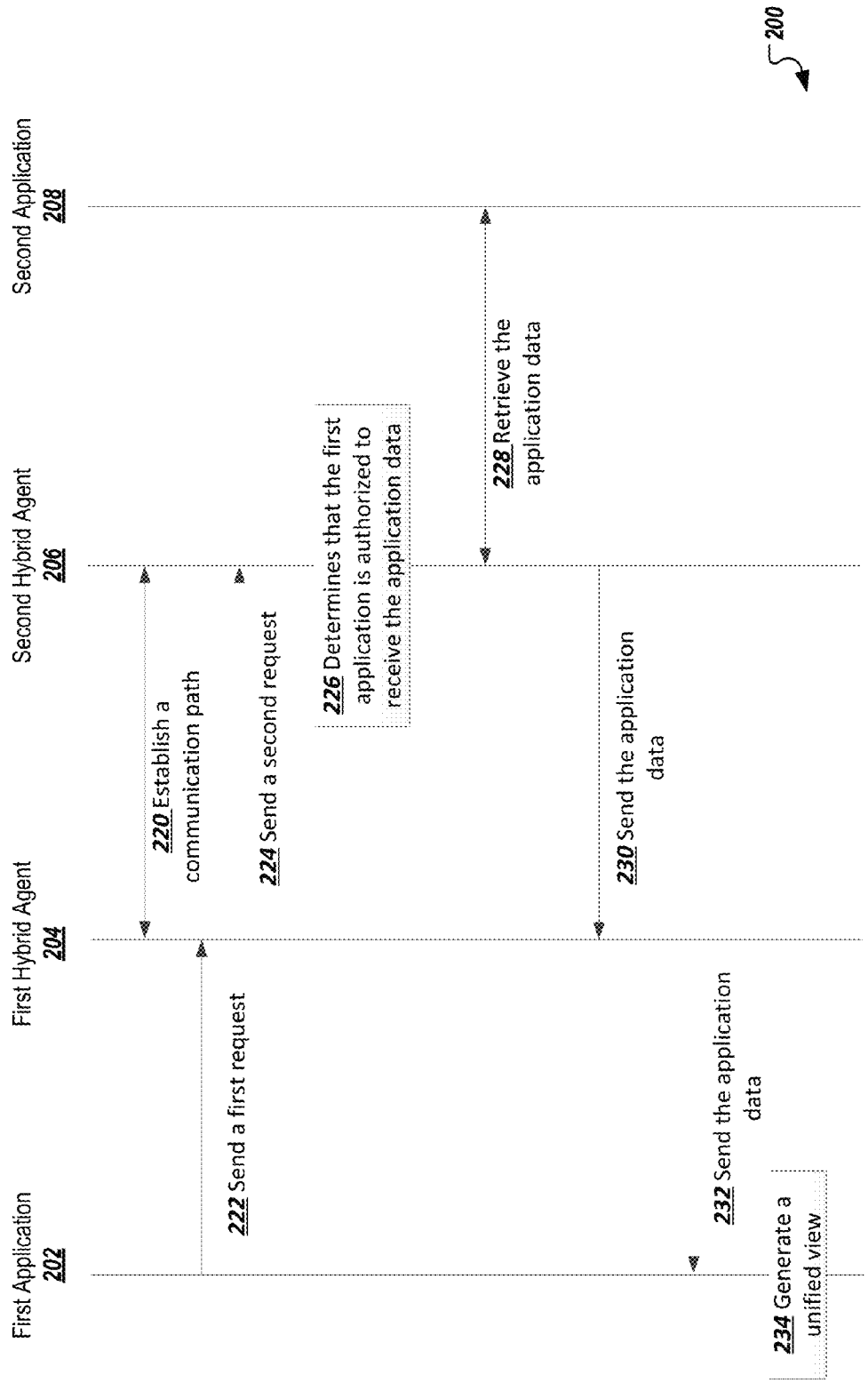
FIG. 2 is a flowchart showing an example process for sharing data across profiles.

FIG. 2 is a flowchart showing an example process 200 for sharing data across profiles. The process 200 can be implemented by a user device in a communication system. For example, the process 200 can be implemented by the communication device 102 shown in FIG. 1 by another type of system or module. The example process 200 shown in FIG. 2 can also be implemented using additional, fewer, or different operations, which can be performed in the order shown or in a different order. The example process 200 includes a first application 202, a first hybrid agent 204, a second hybrid agent 206, and a second application 208. In some instances, the first application 202 and the first hybrid agent 204 can be associated with the same profile, e.g., a first profile. The second application 208 and the second hybrid agent 206 can be associated a different profile, e.g., a second profile. In some instances, the first profile can be an enterprise profile and the second profile can be a personal profile. Alternatively, the first profile can be an enterprise profile and the second profile can be a personal profile.

The example process 200 begins at 220, where a first hybrid agent 204 and a second hybrid agent 206 establish a communication channel. In some implementations, the communication channel can be established by including a communication handle in a command. For example, the first hybrid agent 204 can send a command to the second hybrid agent 206. The command can include a first communication handle addressed to the first hybrid agent 204. The second hybrid agent 206 can use the first communication handle to send a second communication handle addressed to the second hybrid agent 206. The communication handles can be used in subsequent communications between the hybrid agents.

At 222, the first application 202 sends a first request to the first hybrid agent 204. The first request can indicate a request for application data associated with the second application 208. In some implementations, the first request is formatted according to an API that is used to request application data associated with the same profile as the first application 202. At 224, in response to the first request, the first hybrid agent 204 sends a second request to the second hybrid agent 206. The second request can indicate a request for application data associated with the second application 208.

At 226, in response to the second request, the second hybrid agent 206 determines that the first application 202 is authorized to receive the requested application data. In some implementations, the determination is made based on a security policy. In some cases, the security policy can be asymmetric. For example, the security policy can include a first security rule and a second security rule. The first security rule can authorize the first application 202 to receive application data associated with the second application 208, while the second security rule can prohibit the second application 208 to receive application data associated with the first application 202.

At 228, the second hybrid agent 206 retrieves the requested application data from the second application 208. In some implementations, the second application 208 can determine the retrieved application data based on a security policy. For example, a security policy can include a security rule that only a subset of application data can be sent across profiles. In such an example, the second application 208 can determine that the application data is requested by the second hybrid agent 206 and therefore would be sent across profiles. Thus the second application 208 can send a subset of application data to the second hybrid agent 206. At 230, the second hybrid agent 206 sends the requested application data to the first hybrid agent 204. At 232, the first hybrid agent 204 sends the requested application data to the first application 202. The example process 200 ends at 234, where the first application 202 generates, based on the received application data, a graphic interface for presentation. The graphic interface can include a unified view of data associated with both the first and the second profile.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. A computer can include a processor that performs actions in accordance with instructions, and one or more memory devices that store the instructions and data. A computer may also include, or be operatively coupled to receive data from or transfer data to, or both, one or more mass storage devices for storing data, e.g., magnetic disks, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementation descried above should not be understood as requiring such separation in all implementations, and it should be understood that the described program components and systems can generally be integrated together in a single software product or packaged into multiple software products.

Also, techniques, systems, subsystems, and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing form the spirit and scope disclosed herein.

While the above detailed description has shown, described, and pointed out the fundamental novel features of the disclosure as applied to various implementations, it will be understood that various omissions, substitutions, and changes in the form and details of the system illustrated may be made by those skilled in the art, without departing from the intent of the disclosure. In addition, the order of method steps are not implied by the order they appear in the claims.

What is claimed is:

1. A mobile device, comprising:
    a display component;
    data processing apparatus; and
    memory storing a first application associated with a first profile on the mobile device, a first hybrid agent associated with the first profile, a second application associated with a second profile on the mobile device, and a second hybrid agent associated with the second profile, wherein the first and the second hybrid agents are modules configured to provide secure date sharing across profiles;
    the first hybrid agent comprising computer-readable instructions that, when executed by the data processing apparatus, cause the data processing apparatus to:
        receive, from the first application, a first request for application data associated with the second application;
        in response to receiving the first request, send to the second hybrid agent a second request for the application data;
        receive, in response to the second request and from the second hybrid agent, the application data from the second hybrid agent; and
        send the application data to the first application, wherein the application data is used by the first application to generate a graphical interface for presentation on the display component, the graphical interface comprising a unified view of data associated with the first and second profiles; and
    the second hybrid agent comprising computer-readable instructions that, when executed by the data processing apparatus, cause the data processing apparatus to:
        in response to receiving the second request, determine that the first application is authorized to receive the application data based on a security policy;
        retrieve the application data from the second application; and
        send the application data to the first hybrid agent.

2. The mobile device of claim 1, wherein the security policy comprises a first security rule and a second security rule, wherein the first security rule authorizes the first application to receive application data associated with the second application, and wherein the second security rule prohibits the second application to receive application data associated with the first application.

3. The mobile device of claim 1, wherein the first hybrid agent comprises computer-readable instructions that, when executed by the data processing apparatus, cause the data processing apparatus to send a command to the second hybrid agent, wherein the command comprises a communication handle, and wherein the second request is sent using the communication handle.

4. The mobile device of claim 1, wherein the memory stores a third application associated with the first profile, and the first request is formatted according to an application programming interface (API) that is used to request application data associated with the third application.

5. The mobile device of claim 1, wherein the first profile comprises an enterprise profile and the second profile comprises a personal profile.

6. The mobile device of claim 1, wherein the first profile comprises a personal profile and the second profile comprises an enterprise profile.

7. A method, comprising:
    receiving, at a first hybrid agent and from a first application, a first request for application data associated with a second application, wherein the first application and the first hybrid agent are associated with a first profile on a mobile device and the second application is associated with a second profile on the mobile device;
    in response to receiving the first request, sending to a second hybrid agent a second request for the application data, wherein the second hybrid agent is associated with the second profile, wherein the first and the second hybrid agents are modules configured to provide secure date sharing across profiles;
    determining, at the second hybrid agent and in response to receiving the second request, that the first application is authorized to receive the application data based on a security policy;
    retrieving, by the second hybrid agent, the application data from the second application;
    sending the application data to the first hybrid agent;
    receiving, in response to the second request and from the second hybrid agent, the application data from the second hybrid agent; and
    sending the application data to the first application, wherein the application data is used by the first application to generate a graphical interface for presentation on the mobile device, the graphical interface comprising a unified view of data associated with the first and second profiles.

8. The method of claim 7, wherein the security policy comprises a first security rule and a second security rule, wherein the first security rule authorizes the first application to receive application data associated with the second application, and wherein the second security rule prohibits the second application to receive application data associated with the first application.

9. The method of claim 7, further comprising:
sending, at the first hybrid agent, a command to the second hybrid agent, wherein the command comprises a communication handle, and wherein the second request is sent using the communication handle.

10. The method of claim 7, wherein the first request is formatted according to an application programming interface (API) that is used to request application data associated with a third application, wherein the third application is associated with the first profile.

11. The method of claim 7, wherein the first profile comprises an enterprise profile and the second profile comprises a personal profile.

12. The method of claim 7, wherein the first profile comprises a personal profile and the second profile comprises an enterprise profile.

13. One or more non-transitory computer-readable media storing instructions that are executable by one or more data processing apparatus to perform operations comprising:
receiving, at a first hybrid agent and from a first application, a first request for application data associated with a second application, wherein the first application and the first hybrid agent are associated with a first profile on a mobile device and the second application is associated with a second profile on the mobile device;
in response to receiving the first request, sending to a second hybrid agent a second request for the application data, wherein the second hybrid agent is associated with the second profile, wherein the first and the second hybrid agents are modules configured to provide secure date sharing across profiles;
determining, at the second hybrid agent and in response to receiving the second request, that the first application is authorized to receive the application data based on a security policy;
retrieving, by the second hybrid agent, the application data from the second application;
sending the application data to the first hybrid agent;
receiving, in response to the second request and from the second hybrid agent, the application data from the second hybrid agent; and
sending the application data to the first application, wherein the application data is used by the first application to generate a graphical interface for presentation on the mobile device, the graphical interface comprising a unified view of data associated with the first and second profiles.

14. The computer-readable media of claim 13, wherein the security policy comprises a first security rule and a second security rule, wherein the first security rule authorizes the first application to receive application data associated with the second application, and wherein the second security rule prohibits the second application to receive application data associated with the first application.

15. The computer-readable media of claim 13, wherein the operations further comprising:
sending, at the first hybrid agent, a command to the second hybrid agent, wherein the command comprises a communication handle, and wherein the second request is sent using the communication handle.

16. The computer-readable media of claim 13, wherein the first request is formatted according to an application programming interface (API) that is used to request application data associated with a third application, wherein the third application is associated with the first profile.

17. The computer-readable media of claim 13, wherein the first profile comprises an enterprise profile and the second profile comprises a personal profile.

18. The computer-readable media of claim 13, wherein the first profile comprises a personal profile and the second profile comprises an enterprise profile.

* * * * *